United States Patent
Karam et al.

(10) Patent No.: US 8,972,757 B2
(45) Date of Patent: Mar. 3, 2015

(54) POWERED DEVICE CLASSIFICATION IN A WIRED DATA TELECOMMUNICATIONS NETWORK

(71) Applicant: Cisco Technology, Inc., San Jose, CA (US)

(72) Inventors: Roger A. Karam, Mountain View, CA (US); John F. Wakerly, Oakbrook Terrace, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/133,468

(22) Filed: Dec. 18, 2013

(65) Prior Publication Data

US 2014/0108847 A1     Apr. 17, 2014

Related U.S. Application Data

(62) Division of application No. 13/644,221, filed on Oct. 3, 2012, now Pat. No. 8,635,473, which is a division of application No. 13/298,978, filed on Nov. 17, 2011, now Pat. No. 8,316,223, which is a division of application No. 10/981,203, filed on Nov. 3, 2004, now Pat. No. 8,074,084.

(51) Int. Cl.
| | | |
|---|---|---|
| *G06F 1/26* | (2006.01) | |
| *G06F 9/00* | (2006.01) | |

(Continued)

(52) U.S. Cl.
CPC *G06F 1/26* (2013.01); *H04L 12/10* (2013.01); *H04L 12/44* (2013.01)
USPC .................. 713/310; 713/1; 713/340; 726/36

(58) Field of Classification Search
CPC ........... G06F 1/26; G06F 1/263; H04L 12/10; H04L 12/44; H04L 12/40045; H02J 2007/006
See application file for complete search history.

(56) References Cited

U.S. PATENT DOCUMENTS

| | | |
|---|---|---|
| 4,835,737 A | 5/1989 | Herrig et al. |
| 5,122,691 A | 6/1992 | Balakrishnan |

(Continued)

FOREIGN PATENT DOCUMENTS

WO     9623377 A1     8/1996

OTHER PUBLICATIONS

"IEEE Standard 802.3afTm", IEEE Standard for Information Technology—Telecommunications and Information Exchange Between Systems—Local and Metropolitan Area Networks-Specific Requirement, IEEE The Institute of Electrical and Electronics Engineering, Inc., Jun. 18, 2003.

(Continued)

*Primary Examiner* — Dennis M Butler
(74) *Attorney, Agent, or Firm* — Novak Druce Connolly Bove + Quigg LLP

(57) ABSTRACT

In a wired data telecommunication network power sourcing equipment (PSE) coupled to a powered device (PD) carries out an inline power discovery process to verify that the PD is adapted to receive inline power, then a plurality of classification cycles are carried out to convey a series of inline power classes back to the PSE. The series of inline power classes may all be the same, in which case the PD is legacy equipment and is adapted to receive the power level corresponding to that class. If they are not all the same, information is thus conveyed to the PSE which may, for example, correspond to a specific power level to be applied or to other information.

20 Claims, 8 Drawing Sheets

(51) Int. Cl.
*H04L 12/10* (2006.01)
*H04L 12/44* (2006.01)

(56) References Cited

U.S. PATENT DOCUMENTS

| | | | |
|---|---|---|---|
| 5,148,144 | A | 9/1992 | Sutterlin et al. |
| 5,237,511 | A | 8/1993 | Caird et al. |
| 5,268,592 | A | 12/1993 | Bellamy et al. |
| 5,289,359 | A | 2/1994 | Ziermann |
| 5,386,567 | A | 1/1995 | Lien et al. |
| 5,406,260 | A | 4/1995 | Cummings et al. |
| 5,461,671 | A | 10/1995 | Sakuragi et al. |
| 5,483,574 | A | 1/1996 | Yuyama |
| 5,491,804 | A | 2/1996 | Heath et al. |
| 5,531,612 | A | 7/1996 | Goodall et al. |
| 5,608,792 | A | 3/1997 | Laidler |
| 5,613,130 | A | 3/1997 | Teng et al. |
| 5,639,267 | A | 6/1997 | Loudermilk |
| 5,726,506 | A | 3/1998 | Wood |
| 5,742,513 | A | 4/1998 | Bouhenguel et al. |
| 5,758,102 | A | 5/1998 | Carey et al. |
| 5,775,946 | A | 7/1998 | Briones |
| 5,790,391 | A | 8/1998 | Stich et al. |
| 5,790,873 | A | 8/1998 | Popper et al. |
| 5,793,987 | A | 8/1998 | Quackenbush et al. |
| 5,796,185 | A | 8/1998 | Takata et al. |
| 5,808,660 | A | 9/1998 | Sekine et al. |
| 5,809,256 | A | 9/1998 | Najemy |
| 5,834,925 | A | 11/1998 | Chesavage |
| 5,884,086 | A | 3/1999 | Amoni et al. |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,310,781 | B1 | 10/2001 | Karam |
| 6,396,392 | B1 | 5/2002 | Abraham |
| 6,448,899 | B1 | 9/2002 | Thompson |
| 6,496,105 | B2 | 12/2002 | Fisher et al. |
| 6,541,878 | B1 | 4/2003 | Diab |
| 6,701,443 | B1 | 3/2004 | Bell |
| 6,762,675 | B1 | 7/2004 | Cafiero et al. |
| 6,764,343 | B2 | 7/2004 | Ferentz |
| 6,804,351 | B1 | 10/2004 | Karam |
| 6,958,699 | B1 | 10/2005 | Karam |
| 6,986,071 | B2 | 1/2006 | Darshan et al. |
| 7,089,126 | B2 | 8/2006 | Muir |
| 7,145,439 | B2 | 12/2006 | Darshan et al. |
| 7,154,381 | B2 | 12/2006 | Lang et al. |
| 7,159,129 | B2 | 1/2007 | Pincu et al. |
| 7,162,377 | B2 | 1/2007 | Amrod et al. |
| 7,921,307 | B2 | 4/2011 | Karam et al. |
| 8,074,084 | B2 | 12/2011 | Karam et al. |
| 8,316,223 | B2 | 11/2012 | Karam et al. |
| 8,635,473 | B2 * | 1/2014 | Karam et al. .................. 713/310 |
| 2004/0073597 | A1 | 4/2004 | Caveney et al. |
| 2004/0146061 | A1 | 7/2004 | Bisceglia et al. |
| 2004/0260794 | A1 | 12/2004 | Ferentz et al. |
| 2005/0085212 | A1 | 4/2005 | Peker et al. |
| 2005/0132240 | A1 | 6/2005 | Stineman, Jr. et al. |
| 2005/0197094 | A1 | 9/2005 | Darshan et al. |
| 2005/0257262 | A1 | 11/2005 | Matityahu et al. |

OTHER PUBLICATIONS

"3Com® NJ1 00 Network Jack Power", printed from http://www.pooweroverethernet.com/manual/contentlview/full/776/, 3Com, Tuesday, Mar. 18, 2003.

3Com User Guide—3Com IntelliJack, Model NJ220, Version 1.0, 3Com, Nov. 2003.

International Search Report for International Application No. PCT/US2005/036392, date of mailing Mar. 10, 2006.

"3Com User Guide," 3Com Network Jack, Model NJ200, Version 1.0, 3Com, Sep. 2002.

International Search Report for International Application No. PCT/US2005/036329, date of mailing Sep. 4, 2006

International Preliminary Report on Patentability Application No. PCT/US2005/036328, date of mailing May 18, 2007.

Lynn, K., "Universal Serial Bus (USB) Power Management," Wescon Conference, IEEE, Sep. 1998, pp. 194-201.

International Search Report for International Application No. PCT/US2005/036328, date of mailing Aug. 3, 2006.

Invitation to Pay Additional Fees (Partial International Search), Application No. PCT/US2005/036328, date of mailing May 26, 2006.

Mendelson, G., White Paper, All You Need to Know About Power Over Ethernet (PoE) and the IEEE 802.3af Standard, pp. 1-24, Jun. 2004.

* cited by examiner

POWERED DEVICE CLASSIFICATION IN A WIRED DATA TELECOMMUNICATIONS NETWORK

CROSS REFERENCE TO RELATED APPLICATIONS

This is a divisional of U.S. patent application Ser. No. 13/644,221, filed on Oct. 3, 2012, which is a divisional of U.S. patent application Ser. No. 13/298,978, filed Nov. 17, 2011, now U.S. Pat. No. 8,316,223, issued Nov. 20, 2012, which is a divisional of U.S. patent application Ser. No. 10/981,203, filed Nov. 3, 2004, now U.S. Pat. No. 8,074,084, issued Dec. 6, 2011. The content of these are incorporated by reference herein in their entireties.

BACKGROUND

Inline Power (also known as Power over Ethernet and PoE) is a technology for providing electrical power over a wired data telecommunications network (such as, for example, the well-known Ethernet) from power source equipment (PSE) to a powered device (PD) over a link section. The power may be injected by an endpoint PSE at one end of the link section or by a midspan PSE along a midspan of a link section that is distinctly separate from and between the media dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission and reception (collectively: "transceiving") of Ethernet packets with the transmission and reception of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, floating 48 Volt power currently available at a range of power levels from about 4 watts to about 15 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from centertapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two nondata carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline Power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether Inline Power is delivered over Pair 1-2, Pair 3-4 or Pair 1-2+Pair 3-4. In the circuit shown in FIG. 1E a PD associated with Pair 1-2 is powered by Inline Power over Pair 1-2 and a PD associated with Pair 3-4 is similarly powered. The approach used will depend upon the PD to be powered.

In accordance with the IEEE 802.3af standard as presently constituted, a PSE carries out an inline power detection process, and, if successful, an inline power classification process. The detection process attempts to detect an identity network present at the PD. This is usually a 25,000 ohm resistor which is detected by applying a first voltage across the inline power conductors and reading a first current drawn, then applying a second, higher voltage and reading a second current drawn. If the detection process measures the resistance as 25,000 ohms, then a PD capable of accepting inline power pursuant to the IEEE 802.3af standard is present. Otherwise, it is not. If such a PD is present, then under the IEEE 802.3af standard a classification process is implemented to apply a third voltage and measure a third current drawn. The third current drawn characterizes the PD as a member of one of a set of five IEEE 802.3af classes. Depending upon the class, up to a certain amount of inline power should be provided to the PD by the PSE.

Inline Power is also available through techniques that are non-IEEE 802.3af standard compliant as is well known to those of ordinary skill in the art. The techniques described herein are also generally applicable to systems which are not IEEE 802.3af standard compliant.

In many cases where PDs are used, it may be desirable to provide some additional capacity to classify PDs receiving power from PSEs for at least the purpose of providing more power than is currently contemplated under the IEEE 802.3af standard as well as additional and more precise power gradations.

SUMMARY

In a wired data telecommunication network power sourcing equipment (PSE) coupled to a powered device (PD) carries out an inline power discovery process to verify that the PD is adapted to receive inline power, then a plurality of classification cycles are carried out to convey a series of inline power classes back to the PSE. The series of inline power classes may all be the same, in which case the PD is legacy equipment and is adapted to receive the power level corresponding to that class. If they are not all the same, information is thus conveyed to the PSE which may, for example, correspond to a specific power level to be applied or to other information.

Other aspects of the inventions are described and claimed below, and a further understanding of the nature and advantages of the inventions may be realized by reference to the remaining portions of the specification and the attached drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DESCRIPTION

Figure 1A:
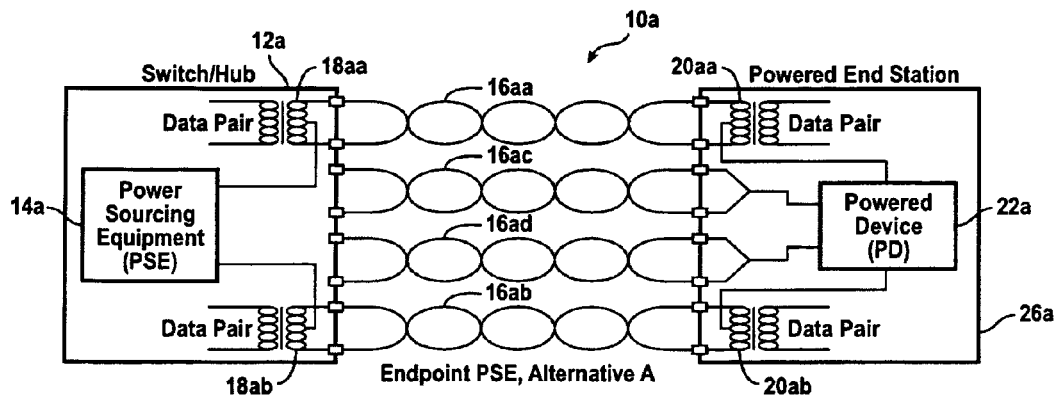
FIGS. 1A, 1B, 1C, 1D and 1E are electrical schematic diagrams of portions of data telecommunications networks in accordance with the prior art.
Figure 1B:
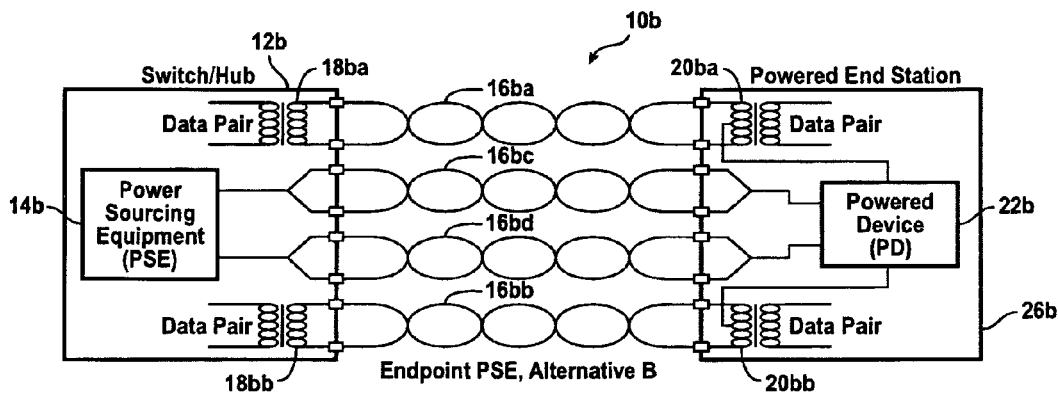
Figure 1C:
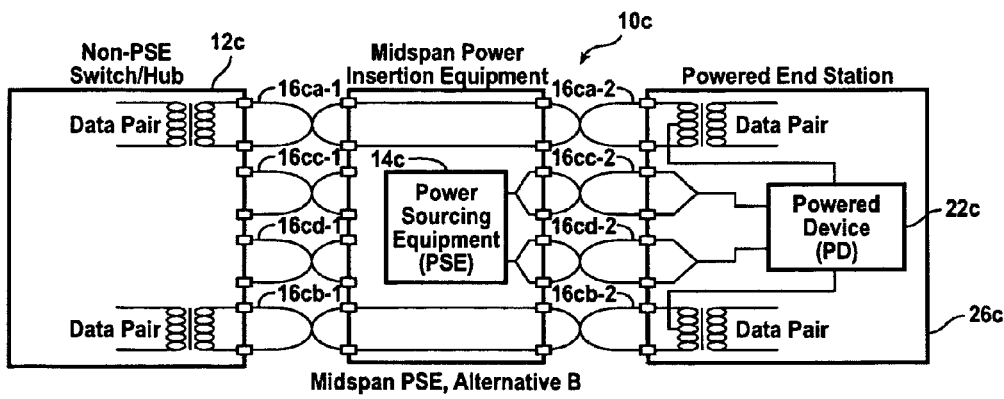

Embodiments of the present invention described in the following detailed description are directed at networks and network devices incorporating inline power over a wired data telecommunications network. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with conventional implementations of the IEEE 802.3af standard, a detection process is carried out periodically over a port to see if an IEEE 802.3af PD is coupled thereto so that inline power may be applied. Full inline power should never be applied to the conductors of a port in any significant amount for any significant amount of time prior to verifying the presence across the conductors of an identity network authorizing the inline power because of fear that a piece of equipment might not operate in a predictable way if it was not built to comply with the IEEE 802.3af standard. Where an appropriate identity network is detected, then a classification process is carried out to determine how much power (current) should be provided to the PD. Once this classification process is complete, the power is applied until, for example, the PD is decoupled from the port. The present invention leverages this standard and provides an additional capability without making prior equipment obsolete. In accordance with the present invention, the detection process is carried out in the same manner, however, the classification process is carried out more than once by the PSE. If the same result is obtained each time the classification process is carried out, then the PD is treated by the PSE as if it is "legacy" IEEE 802.3af PD equipment, i.e., equipment that is unaware of this new capability and thus presents the same class every time it is classified in a sequence to thus flag itself as a legacy device. The PSE implements an algorithm that assigns a class during each unique independent classification cycle in a sequence of cycles, identifies the PD's class response upon each classification cycle in the sequence, assembles a sequence of classes into a binary (or other symbolic) code representing a specific unique sequence based on the different classes (such as those defined under the IEEE 802.3af standard, or otherwise) so that the sequence may be interpreted by software/firmware using a lookup table (or equivalent approach) to identify the PD as a member of a particular "class". To achieve this the PSE applies the same classification voltage over and over, while the PD may elect to draw the same current from the PSE each time (same class) or a sequence of currents not all of which are the same (sequence of different class symbols), whereupon the PSE assembles and constructs a sequence of symbols corresponding to the "class" of the PD.

While some of the discussions herein may specify particular voltages and measured currents or ranges thereof at which certain actions are to be taken, those of ordinary skill in the art will now realize that such voltages and measured currents are not required to practice the invention and that different ranges, values and numbers of ranges may be substituted.

Figure 2:
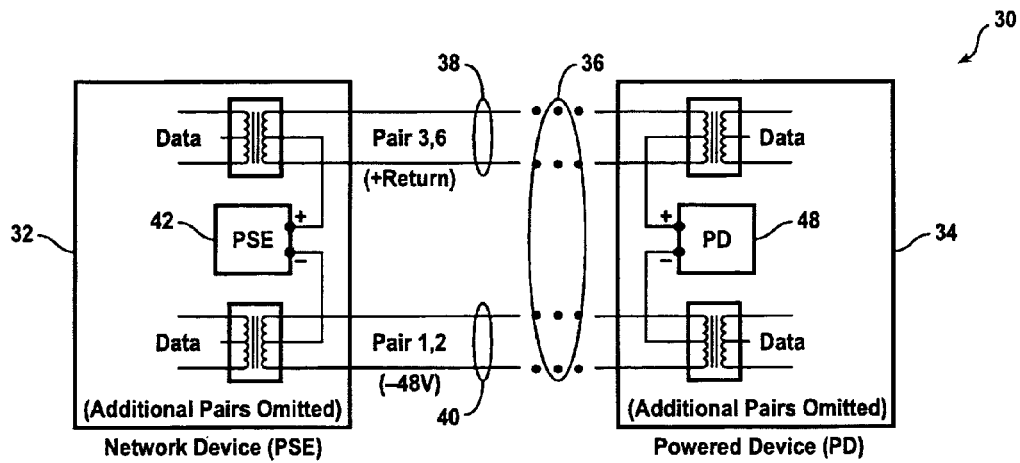
FIG. 2 is an electrical schematic diagram of a network segment in accordance with an embodiment of the present invention.

A network segment 30 is illustrated in FIG. 2. Network segment 30 includes a network device 32 configured as power sourcing equipment (such as a switch or hub, for example) capable of providing inline power according to one or more inline power schemes such as the IEEE 802.3af standard. Network segment 30 also includes powered device 34 which is configured to utilize inline power provided by network device 32. A wired data telecommunications network cable 36 couples network device 32 and powered device 34 and has at least two pairs of conductors. One pair 38 is illustrated here as the conductor 3-6 pair and the other pair shown here, 40, is illustrated as the conductor 1-2 pair. In accordance with this configuration pair 3-6 carries the more positive leg of the inline power and pair 1-2 carries the less positive leg of the inline power. Additional pairs of conductors may be included as is well known to those of ordinary skill in the art, however, they are not shown here in order to avoid overcomplicating the disclosure.

Figure 3:
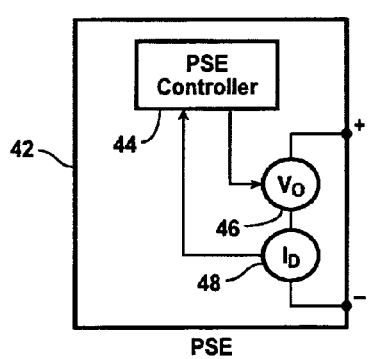
FIG. 3 is a block diagram of a portion of a piece of power sourcing equipment in accordance with an embodiment of the present invention.

PSE block 42 provides inline power to pairs 38 and 40 at network device 32 and reads return current from powered device 34. It is shown in more detail in the block diagram at FIG. 3. Turning to FIG. 3 a PSE controller 44 controls the voltage output of a voltage injector 46 and receives a current indication from current detector 48. Voltage injector 46 is capable of a number of voltage outputs such as an idle state voltage output, an inline power detection voltage level, and other voltage levels associated with the classification of the powered device discussed in more detail below, and a high voltage associated with inline power delivery (typically around −48V DC (direct current)).

Figure 4:
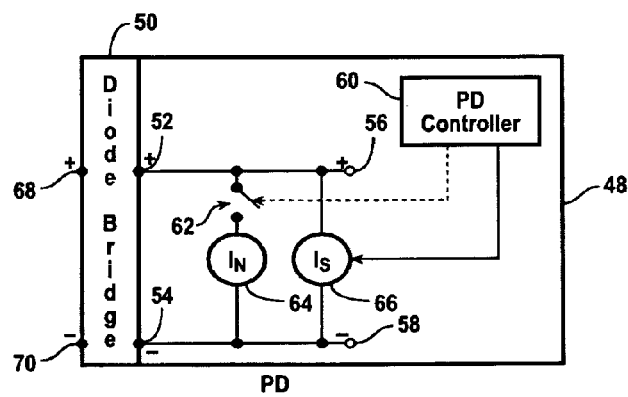
FIG. 4 is a block diagram of a portion of a powered device in accordance with an embodiment of the present invention.
Figure 5:
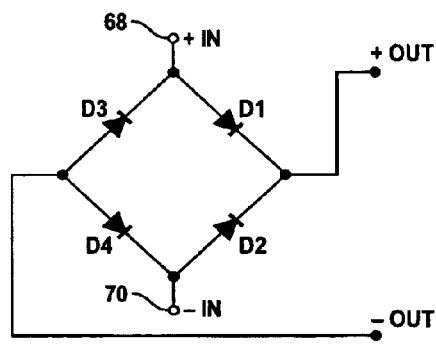
FIG. 5 is an electrical schematic diagram of a diode bridge for use with a powered device in accordance with an embodiment of the present invention.

FIG. 4 is a block diagram illustrating a powered device PD block 48. PD block 48 receives the inline power over the wired data telecommunications network cable 36 as shown in FIG. 2. An optional diode bridge circuit 50 may be included as shown in more detail in FIG. 5 and discussed in more detail below. Voltage received at nodes 52(+) and 54(−) is used to power the powered device 34 via nodes 56(+) and 58(−) if the powered device meets the requirements for receiving inline power. In order to determine if powered device 34 meets those requirements, PD block 48 must first present an identity network 64 to the PSE block 42 over the wired data telecommunications network cable 36 so that its ability to utilize inline power may be confirmed. In accordance with the IEEE 802.3af standard, the identity network is a predetermined resistance such as a 25,000 ohm resistor. Other identity networks may also be used in accordance with other standards or techniques as is well known to those of ordinary skill in the art. PD Controller 60 causes a switch 62 to close (or in an equivalent manner presents the identity network) coupling the identity network 64 to the wired data telecommunications network cable 36 so that it may be detected by the PSE block 42 during an inline power detection phase. At other times the identity network need not be presented and thus switch 62 may be open. Switch 62 may be any circuit element capable of switching electrical current such as a relay, a solid state relay, a diode, a transistor and the like. Alternatively, switch 62 may be omitted and the identity network 64 presented at all times. In order for PD block 48 to convey to PSE block 42 how much power (i.e., current) it would like to have provided to it, a current source device 66 (or a plurality of separately addressed current source devices (such as a current output DAC) which together form current source device 66) is controlled by PD controller 60 to provide certain fixed current values across the wired data telecommunications network cable 36 back to PSE block 42 where the magnitudes of those currents are detected by current detector 48 and conveyed to PSE controller 44. The magnitude and order of a series of those presented currents drawn from the attached PSE in response to application of the classification voltage (in one embodiment the classification voltage is in a range of greater than about 15 volts to less than about 20 volts) is used to convey information from PD block 48 to PSE block 42. The information conveyed may be, for example, a maximum current desired by the powered device 34 from the network device 32, but the present invention may be used to convey any kind of information from the powered device 34 to the network device 32.

Diode bridge 50 is, for example, a conventional full wave bridge rectifier optionally provided to insure that if the wires are misconnected that the more positive signal will be delivered from input nodes 68 and 70 to node 52 and the less positive signal will be delivered to node 54.

In accordance with the present invention, a plurality of classification cycles are carried out by the PSE block 42 on the PD block 48. An advantage of the present invention is that if the PSE block 42 attempts to repetitively classify a PD block belonging to a "legacy" device which is unaware of or unable to utilize this new capability, it will simply respond the same way each time and the PSE will then be able to verify that the device is a legacy device. On the other hand, if it responds with a series of current levels at least one of which is not the same as the others, then the PSE block 42 will be able to verify that the coupled PD block 48 is capable of supplying the new power classes as described herein.

Figure 1D:
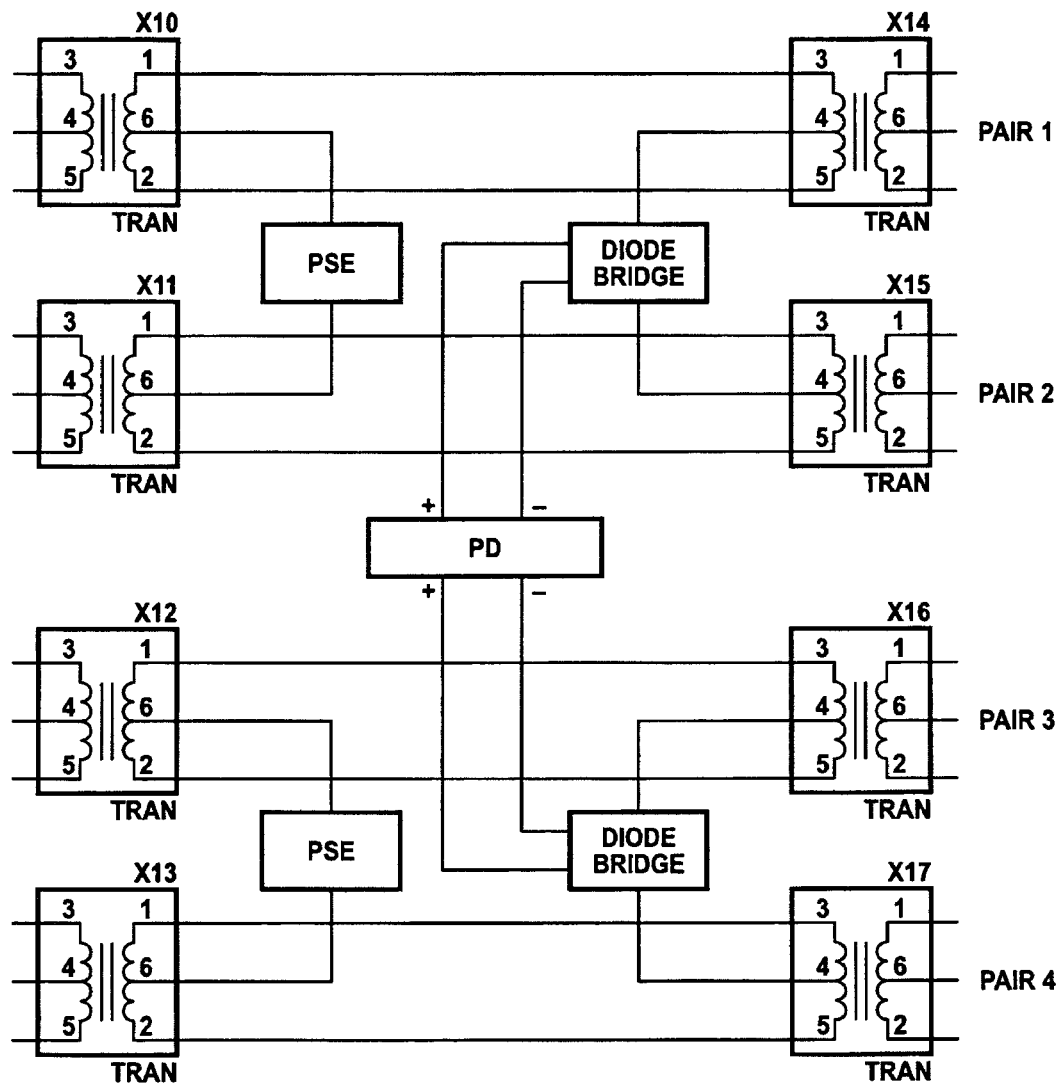
Figure 1E:
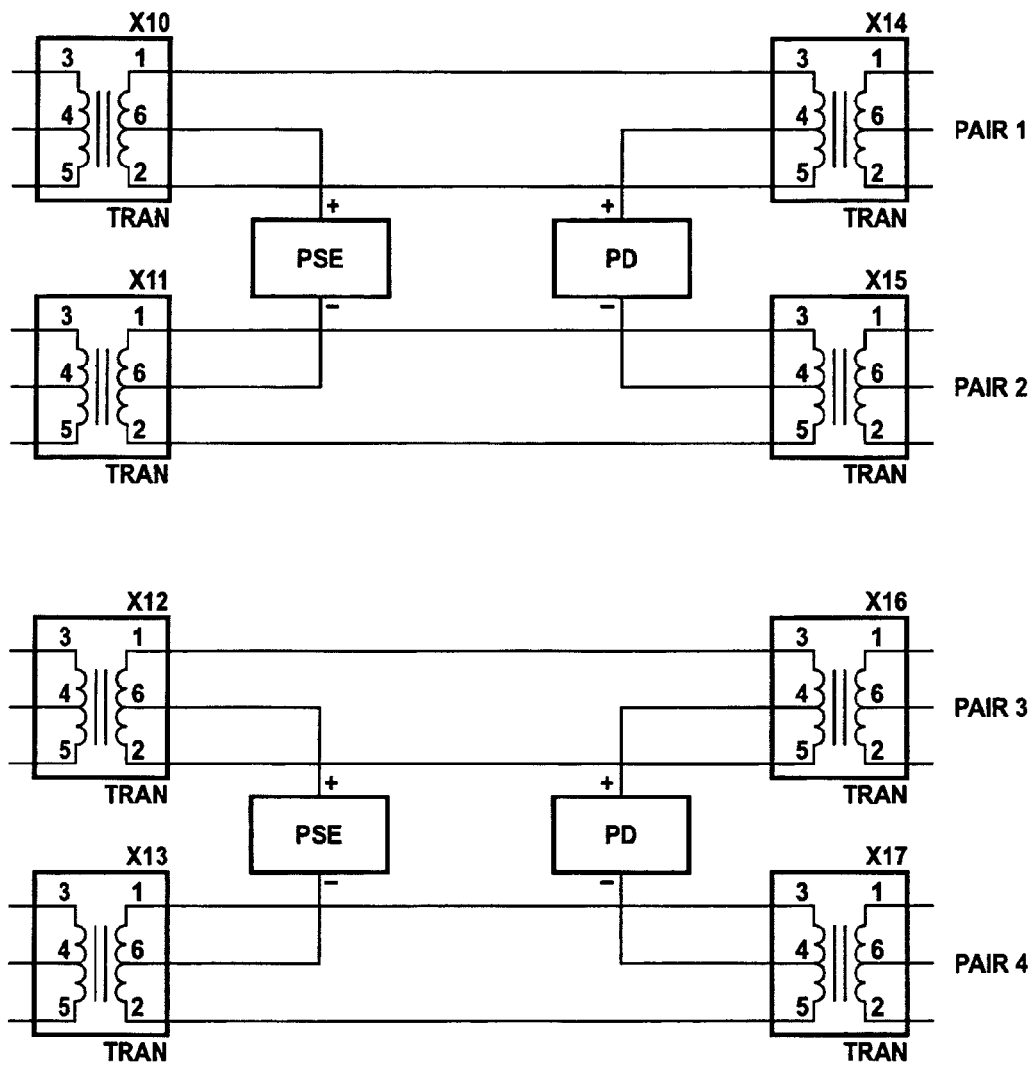
Figure 6:
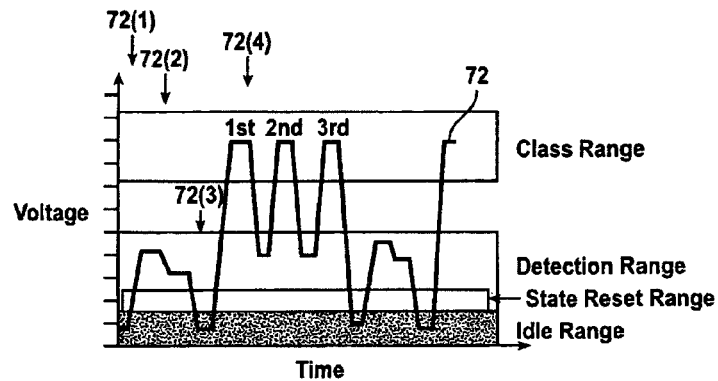
FIGS. 6, 7, 8 and 9 are charts of voltage versus time for various classification processes carried out in accordance with embodiments of the present invention.

FIG. 6 illustrates one embodiment of the present invention. In accordance with this embodiment, the voltage applied by the PSE block 42 to a port connector at the network device 32 (to which cable 36 is attached) is shown as the voltage trace 72 in the graph of voltage versus time. The voltage starts 72(1) at an idle level which in accordance with the IEEE 802.3af standard is typically a value in a range of about 0.0 VDC to about 2.8 VDC. The voltage is occasionally ramped up 72(2) to a level within a detection range and the return current is measured at one or more voltages (typically two separate voltages). While this is going on, an inline power compatible PD block 48 is presenting its identity network so that the interaction of that identity network with the applied voltage can be measured by PSE block 42 (typically as a measured current). In accordance with an embodiment of the present invention, the applied voltage is then ramped up to a classification range 72(4) (it may go through the idle range first to cause a reset at the powered device 72(3)). As shown in FIG. 6 this occurs three times, although any number greater than one is considered to be within the scope of the present invention. As the applied voltage settles in the classification range the PD block 48 via its controller 60 and current source device 66 provides an output current. This output current is, in accordance with an embodiment of the present invention, a current level corresponding to a predetermined measured resistance and device class such as one of the power classes specified in the IEEE 802.3af standard. The present invention also allows the use of different or additional measured current levels in addition to those presently specified in the IEEE 802.3af standard. As a result, after a number of cycles of applying a classification voltage followed by dropping out of the classification range the PSE block 42 will have obtained a sequence of current values which may correspond to power classes. After N classification cycles, each of which could return one of M possible measured currents, the PD block 48 thereby conveys to the PSE block 42 one of $M^N$ (M to the power of N) sequences or codes, corresponding to up to $\log_2(M^N)$ bits of information. This sequence or code can be used to tell the PSE block 42 to allocate and provide up to a certain amount of power (current) via inline power to powered device 34, or can be used for any other purpose. Since more than four conductors may be coupled between network device 32 and powered device 34, this process may take place on two or more pairs of conductors and affect power delivery over whatever conductors are desired. Where four pairs of conductors couple a network device to a powered device a classification process as described could take place on two pairs and control power delivery over all four pairs, and the like. Also note that multiple classification cycles may take place on both sets of pairs in the cable in an alternating fashion, i.e., if power were to be supplied down four pairs of conductors, it is feasible and within the scope of the present invention to use a first pair of the pairs of conductors (four conductors) to carry out a first classification, then alternate and carry out a classification on the second pair of pairs. This is particularly useful in conjunction with the wiring option illustrated in FIG. 1D where a diode bridge arrangement couples all four pairs. This can achieve two goals: first, it can get a specific sequence to identify the PD using multiple classification cycles; second, it can insure that all pairs in the cable are coupled to the same device.

Figure 8:
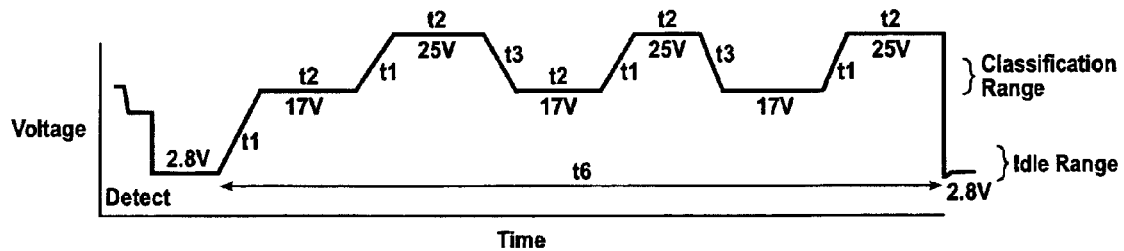

In the embodiment illustrated in the chart of FIG. 6 the applied voltage rises into the classification voltage range (approximately 17 VDC in the IEEE 802.3af standard) and then shifts to a marker level which, in one embodiment of the present invention, is a voltage level less than the classification voltage level and above the reset logic voltage level, e.g., 9 VDC. It need not shift down and could, instead, shift up to a marker level that is at a voltage level above the classification voltage level, e.g., about 25 VDC. This approach is illustrated in the chart of FIG. 8. While the applied voltage is in the specified classification voltage range the PD block 48 will return a current, when it leaves that range (either by increasing or decreasing) it will stop returning the current signal and prepare to return the next current signal.

Figure 7:
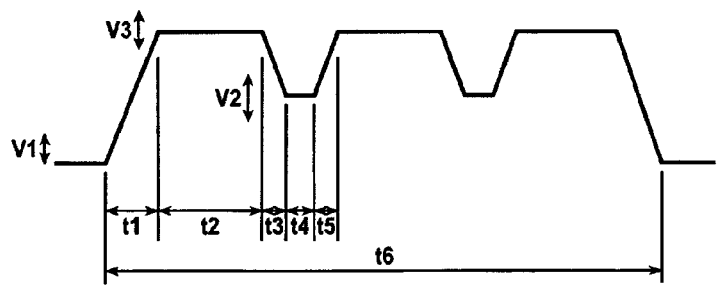

FIG. 7 is a PD voltage versus time chart illustrating an embodiment of the present invention. In accordance with this embodiment, V1 is the idle level voltage, V3 is the classification voltage, V2 is the marker voltage outside of the classification voltage range to which the signal ramps between classification cycles. t1 is the ramp time to go from V1 to V3 (and vice versa), t2 is the period of time that the voltage stays in the classification range, t3 is the period of time for the voltage to ramp from the classification voltage level to the marker level, t4 is the dwell time at the marker level, t5 is the ramp time from the marker level back to the classification level. In an embodiment of the present invention (and many other values are possible for these variables and intended to be within the scope of the present invention), t1 is between 1 and 4 mSec, t2 is between 10 and 25 mSec, t3 is between 0.13 and 7 mSec, t4 is between 5 and 10 mSec, t5 is between 0.13 and 7 mSec and t6 (the time to accomplish the entire classification using three classification cycles) is between 47 and 155 mSec and preferably less than or equal to about 75 mSec. V1 is in a range of about 0.0 VDC to about 2.8 VDC; V2 is in a range of about 7.5 to about 9.5 VDC; and V3 is in a range of about 15.5 to about 20.5 VDC. When the applied voltage is in a range of between about 2.8 VDC and about 5.0 VDC a state reset will occur at the PD block 48 causing it to go back and wait for the first classification cycle. Those of ordinary skill in the art will now appreciate that the timing values may be set to any convenient values and the voltage values and ranges need not be those exact values and ranges set forth above.

Figure 9:
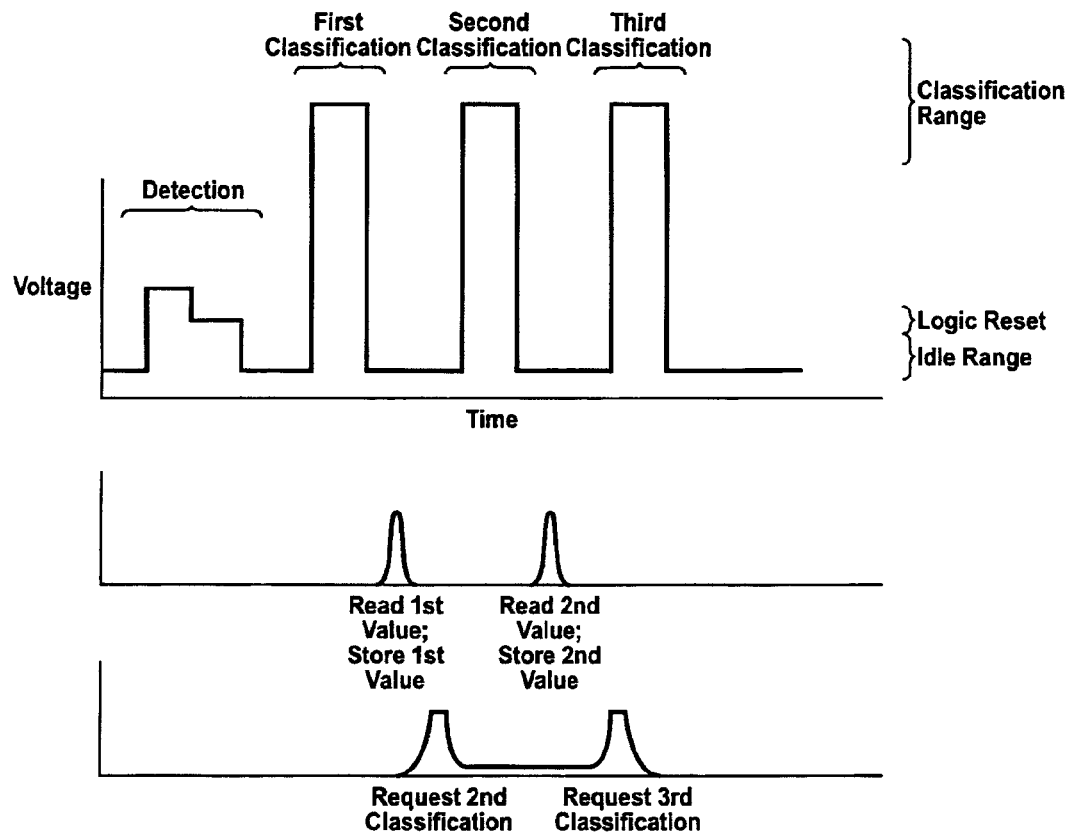

FIG. 9 illustrates the operation of another embodiment of the present invention. In this case the PSE is a legacy IEEE 802.3af PSE. Such devices can normally be requested to initiate a classification cycle either by application of an electrical signal or by a software/firmware command. In accordance with this embodiment of the invention, the legacy PSE would do a detect and classification cycle as shown in FIG. 9. At the end of its first classification cycle, the applied voltage drops below the logic reset threshold and into the idle range. In this case, however, a non-legacy PD is provided and it incorporates a nonvolatile memory (NVM) which may be of the charge storage type or of the type sustained by power stored in a capacitor-like circuit component. In this manner the fact that a first classification has taken place is not lost by the PD and it may now provide its second classification response without resetting despite the fact that the applied voltage has dropped below the logic reset threshold at least for a short period of time.

Next, a software/firmware modification to the legacy PSE causes it to store a representation of the first classification result in a memory and then initiate one or more additional subsequent classification cycles.

When all classification cycles are complete, the last result (which may or may not be intermediately stored in a memory) is combined with the previously stored result values to come up with a classification code word which can then be used to look up the action to take (such as applying a certain maximum level of inline power).

Figure 10:
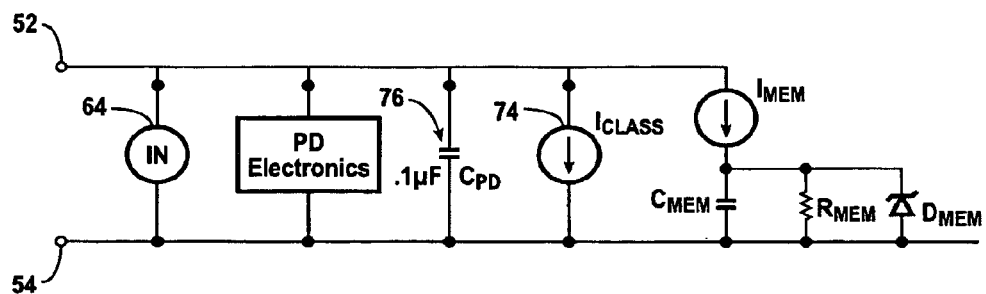
FIG. 10 is an electrical circuit block diagram of a portion of a PD in accordance with an embodiment of the present invention.

In the case of capacitor powered memory, the logic circuit at the PD will be cleared when the memory capacitor is discharged by dropping the applied PSE voltage below a certain threshold for a long enough period of time, e.g., 0.5 second or thereabout due to the discharging effect of the capacitor through the identity network or other circuitry such as a current source. A clear-memory signal can be transmitted to erase a charge-based NVM-type memory (e.g., EEPROM (electrically erasable programmable read only memory)), if used. The high voltages needed by such memories can be supplied by conventional charge pumps. In order to insure that the voltage on the PD capacitor (a capacitor coupled in parallel with the identity network and forming an RC circuit with it) can decrease to the PSE-applied voltage within a reasonable period of time, active discharge may be used. This may be implemented at the PSE by using a current source to drain the PD capacitor over the conductors. This may also be implemented at the PD as illustrated in schematic/block diagram form in FIG. 10. In FIG. 10 the identity network, PD electronics, $C_{PD}$ and current source $I_{CLASS}$ are all coupled between the two conductors at nodes 51 and 54. Current source $I_{CLASS}$ is used to report the classification current. $C_{PD}$, is the PD capacitor mentioned above (typically about 0.1 uF). Current source $I_{MEM}$ is used to feed a portion of the available current to the capacitor-based nonvolatile memory capacitor $C_{MEM}$. Resistor $R_{MEM}$ is selected to discharge capacitor $C_{MEM}$ in a reasonable amount of time. Zener diode $Z_{MEM}$ is used to set the value of the voltage across $C_{MEM}$, i.e., the supply voltage for the memory.

Active discharge entails turning on a current source 74 at the PD to discharge the PD capacitor 76. This current source can be made active when the voltage across the capacitor 76 exceeds the voltage applied to the PD from the PSE.

The IEEE 802.3af standard defines five power classes which correspond to certain currents returned by the PD to the PSE during a classification cycle. These are set forth in Table I:

TABLE I

| Class | PSE Classification Current Range (mA) | Corresponding Inline Power Level (W) |
|---|---|---|
| 0 | 0-5 | 15.4 |
| 1 | 8-13 | 4.0 |
| 2 | 16-21 | 7.0 |
| 3 | 25-31 | 15.4 |
| 4 | 35-45 | 15.4 |

By adapting this scheme to a plural classification system, a 30 W power level could be defined, for example, with a 3-0-3 or a 0-3-0; a 40 W power level could be defined, for example, with a 2-0-2, and the like. Where additional classification is required, additional current classes may be added to the basic IEEE 802.3af specification, e.g. as set forth in TABLE II:

TABLE II

| Class | PSE Classification Current Range (mA) | Corresponding Inline Power Level (W) |
|---|---|---|
| 5 | 51-61 | Not presently defined by the standard |

Note that in accordance with the IEEE 802.3af standard, if a current much higher than about 70-80 mA and less than about 100 mA is detected during a classification cycle, especially at the beginning of the classification cycle, the PSE will process this as an over current fault and no more classification cycles will take place in order to avoid damage. The PSE may or may not continue with classification cycles to attempt to power such a PD. Non-IEEE 802.3af standard compliant systems need not incorporate this limitation.

Accordingly, sequences of identical values would simply continue to represent the value corresponding to the identical value, e.g., 0-0-0 would represent Class 0, and the like. Mixed values would be defined, as with a lookup table, to represent other values and/or other actions to be taken. For example, where it is desirable to be extremely precise in the amount of power allocated, different power levels could be assigned to different sequences, so with 6 possible classes (0-5) and three positions there would be 210 minor classes available for use in addition to the 6 major classes. If even more are desired, a fourth or fifth (or more) classification cycle can be added as can additional classes. Additionally, a specific code, e.g., 5-5-4 could be defined to specify, for example, that an additional sequence of current values is to be read in addition to the initial three, e.g., 5-5-4-1-2-3-4-5. Such a coding system may now be used to convey information in addition to desired power levels. For example, a Voice Over Internet Protocol (VoIP) telephone configured as a powered device could be programmed to temporarily break its connection with the PSE port to force the PSE to reclassify it (disruption of the inline power current draw will cause such a reset) and then, upon reclassification, it could send a message. The message could take any form, such as to cause the switch to send an alert to someone, such as a security official in response to a panic button associated with the telephone being depressed, or, if a temperature or other environmental sensor were included in the telephone, it could report an anomalous condition sensed by that sensor, such as a fire, or the like, via the switch to an appropriate recipient.

Because the PD is, by definition, a powered device and does not receive any power until inline power is applied, it needs to have some power in order to carry out the interactions described herein with the PSE. This may be as simple as charging a capacitor to power its internal circuitry while it is coupled to the PSE and receiving either the idle current signal, an intermediate signal and/or the classification voltage signal. To charge its capacitor, the PD may choose to use a fraction of the current it draws from the PSE during its first classification cycle. The charge on the capacitor helps the PD keep its low power memory alive so that the right sequence can be presented to the PSE as more classification cycles occur. Its current source device 66 is adapted to operate on the applied power from the PSE during the classification phase. Avoiding dropping the idle current to zero can avoid a situation where the PD would forget where it was in the classification process and reset. It will reset if the voltage drops into the region denoted 72(3) in FIG. 6.

Figure 11:
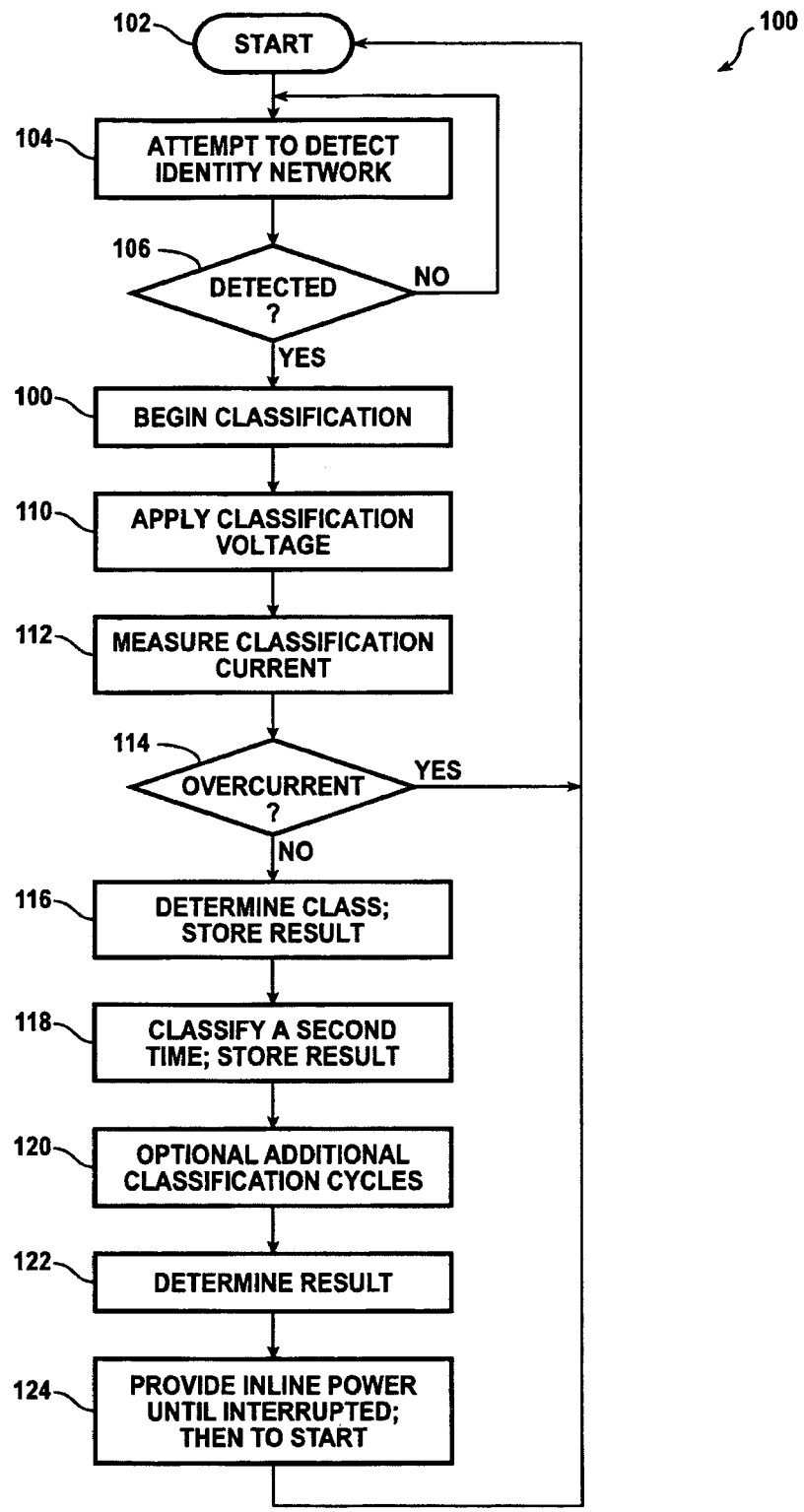
FIGS. 11 and 12 are process flow diagrams of processes carried out in accordance with various embodiments of the present invention.

Turning now to FIG. 11, a process flow diagram illustrates the process flow 100 from the PSE side of the connection in accordance with an embodiment of the present invention. The process starts at block 102. At block 104 the PSE attempts to discover the PD by carrying out a detection process aimed at verifying the presence of an appropriate identity network disposed across the conductors of the wired data telecommunications network. If no identity network is found (block 106), control reverts back to block 104 to continue the detection process from time to time until an identity network is found. If an identity network is found, control passes to block 108 where the classification process starts. As discussed above, the classification process involves a plurality of cycles into and out of a classification voltage range (block 110) while reading the return current while in the classification voltage range (block 112). If an overcurrent condition ever exists, the control should revert to the beginning at block 102 to immediately avoid the overcurrent condition (block 114). In an embodiment of the present invention the overcurrent monitoring is performed at the PSE and not at the PD. Each measured current corresponds to a "class" such as the IEEE classes described above, or other classes defined in a non-IEEE 802.3af standard system. These classes are determined (block 116) by correlating the measured current with a class value or other representation. This may be done in one embodiment of the invention, by a lookup table or other software/firmware implementation which yields a class value in response to the measured current. The collection of classes thus determined are kept while other classification cycles are performed (block 118, block 120) and together these classes determine the sequence of classes assembled and stored in controller 44 of FIG. 3 as a binary (or other symbolic) code word, allowing the software/firmware to access controller 44 and, using a lookup table or similar approach, carry out the proper function, e.g., determine the resulting classification (block 122) and provide inline power until interrupted (block 124) and once interrupted, return to start. As discussed above, the information contained in the classification can result in the allocation of a certain corresponding power level to the PD or may mean something else such as a measured environmental condition, or the like. The PSE acts on the determined result, accordingly.

Figure 12:
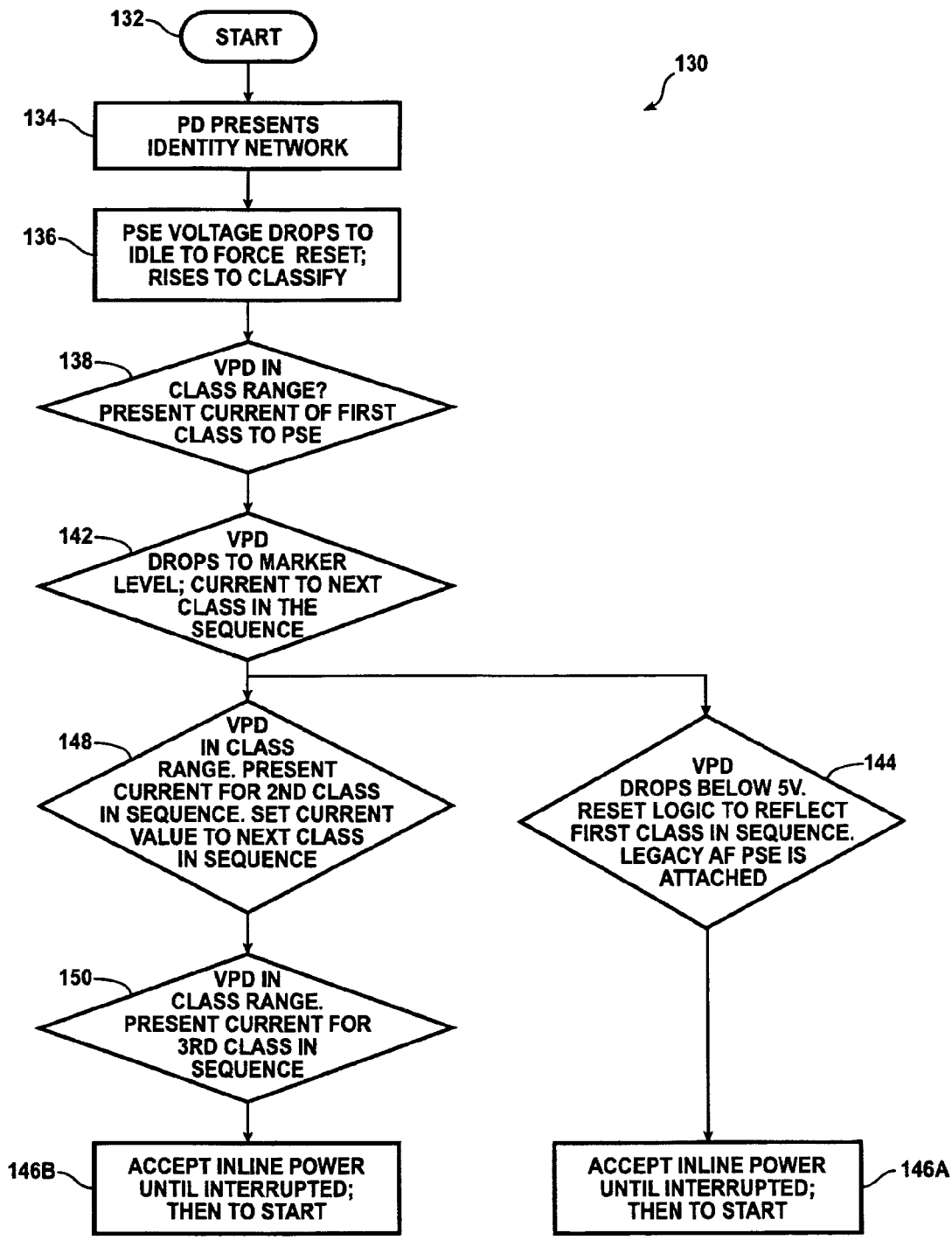

Turning now to FIG. 12, a process flow diagram illustrates the process flow 130 from the PD side of the connection in accordance with an embodiment of the present invention. The process starts at block 132. At block 134 the PD presents its identity network across the conductors of the wired data telecommunications network (e.g., across two pairs). The identity network may be a 25,000 ohm resistance if the PD is IEEE 802.3af standard compliant. The identity network may be presented in response to a detection by the PD of the idle voltage level (or simply be present at all times). At block 136, the voltage applied by the PSE ("VPD") rises to carry out the detection of the identity network, drops into the idle range to force a reset of the PD, and raises into the classification range for the first time. In block 138 when the applied voltage from the PSE reaches the classification range the PD draws its first classification current on the wired data telecommunications network cable. At block 142 when the VPD departs the classification voltage range (either by going up or by going down, but not by going into the state reset or idle voltage ranges) then the PD presents its next class current. At block 144 if the VPD continues to drop into the reset logic or idle levels then the PSE is a legacy PSE and the PD knows that it can only receive inline power corresponding to its first class response and that no further inline power classification may take place. Control transfers from block 144 to block 146A where the PD operates as a legacy PD receiving inline power until some other condition appears. Also, a PD may see a continuing loop of detection and classification for a limited an unbounded amount of time, (e.g., the PSE cannot supply power at this time) in such a case, if a legacy IEEE 802.3af PSE is attached, the PD will repeatedly present its 25,000 ohm identity network followed by the first class in its sequence since its logic gets reset upon a new detection cycle or upon entering its own logic reset threshold on the way down to the 2.8 VDC voltage level required to be reached at the end of a detection cycle. At block 148 the second current in sequence is presented when the VPD is in classification range. At block 150 the third (and there may be more of these) classification is presented when the VPD is in classification range. Then control transfers to block 146B where the inline power level requested in the multi-cycle classification process is provided to power the PD until interrupted. If power is interrupted, control transfers back to the start (block 132) and the PD presents its first class in response to a classification cycle by the PSE.

Note that any number of cycles may be carried out, as appropriate to the particular application. Also note that the PD could be configured to continue presenting various values each time it is classified until the VPD drops into the state reset range.

It should be noted that while certain circuitry has been shown in the configurations of the PSE/PD ports, any circuitry suitable to carry out the functions specified may be used and the implementation of such circuitry in any number of various forms is well within the skill of those of ordinary skill in the art having the benefit of this disclosure. It should also be noted that while in several contexts the "disruption" of power and/or data to a port of a network device has been discussed as a precursor to a switching event to reconstitute data and/or power over wired network service to a particular port, the disruption or the switching event in the absence of a disruption could be caused by a command to the network device from a control point such as a master control center or other control location, a hardware or software failure, deliberate (or inadvertent) de-powering of a device, or from any other cause.

In accordance with an embodiment of the present invention, a high security device such as a telephone or camera receiving inline power over a wired data telecommunication network could be configured to not receive inline power if it was receiving inline power and that power was temporarily interrupted. A cable failure or unplug/replug cycle could cause this and under certain circumstances it would be desirable to require a confirmatory act such as operator intervention and/or password entry into a computer device on the wired data telecommunications network before resupplying the inline power. Such a failure could also trigger an alarm or message to an appropriate network control point.

In accordance with another embodiment of the present invention, a PD could present a sequence of power classes that assemble into a codeword meaning "data and/or power redundancy are required," "power over 4 pairs of conductors is required," and the like. Similarly, a device might signal that it is a "high-priority" device and, as such, should be given priority in inline power so that if there is a shortage of inline power available, power should be given up by other devices to power the priority device.

In accordance with an embodiment of the present invention, a security message may be sent from the PD to the PSE as follows: (1) interrupting a flow of inline power between the PSE and the PD at the PD in response to a security alert input (such as a manual input like a switch closure or a sensor-based input like a temperature sensor limit crossing or the like); (2) initiating an inline power discovery cycle in response to said interrupting; and (3) presenting at the PD, in response to the security alert input and said initiating, an identification network corresponding to the security message. In this case the identity network would be different from, for example, the IEEE 802.3af standard 25,000 ohm resistance—say 30,000 ohms or 15,000 ohms, or the like. In response to receipt of the security message at the PSE an alarm could be sounded, a message could be forwarded, or the like.

In accordance with another embodiment of the present invention, a security message may be sent from the PD to the PSE as follows: (1) interrupting a flow of inline power between the PSE and the PD at the PD in response to a security alert input (such as a manual input like a switch closure or a sensor-based input like a temperature sensor limit crossing or the like); (2) initiating an inline power discovery cycle in response to said interrupting; (3) discovering that the PD is adapted to receive inline power from the PSE; (4) conducting a plurality of inline power classification cycles, each comprising: applying a classification voltage to the conductors; measuring current in the conductors while the classification voltage is applied; and determining a class corresponding to the measured current; (5) combining the plurality of classes determined into a classification code for the PD; and (6) determining that the classification code corresponds to a predetermined security message. In response to receipt of the security message at the PSE an alarm could be sounded, a message could be forwarded, or the like.

In accordance with another embodiment of the present invention, a priority message may be sent from the PD to the PSE in order to get a high priority allocation of available (or previously assigned) inline power resources, as follows: (1) interrupting a flow of inline power between the PSE and the PD at the PD in response to a security alert input; (2) initiating an inline power discovery cycle in response to said interrupting; and (3) presenting at the PD, in response to the security alert input and said initiating, an identification network corresponding to the request for priority.

In accordance with another embodiment of the present invention, a priority message may be sent from the PD to the PSE in order to get a high priority allocation of available (or previously assigned) inline power resources, as follows: (1) interrupting a flow of inline power between the PSE and the PD at the PD in response to request for priority input; (2) initiating an inline power discovery cycle in response to said interrupting; (3) discovering that the PD is adapted to receive inline power from the PSE; (4) conducting a plurality of inline power classification cycles, each comprising: applying a classification voltage to the conductors; measuring current in the conductors while the classification voltage is applied; and determining a class corresponding to the measured current; (5) combining the plurality of classes determined into a classification code for the PD; and (6) determining that the classification code corresponds to a request for priority.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A system, comprising:
   a computing device processor; and
   a memory device including instructions that, when executed by the computing device processor, cause the system to:
      initiate an inline power discovery cycle in response to an interrupted flow of inline power between power source equipment (PSE) and a powered device (PD) responding to a security alert input, wherein the inline power is received at the PD from and coupled to the PSE in a wired data communications network having conductors coupling the PD and the PSE;
      discover that the PD is adapted to receive inline power from the PSE;
      conduct a plurality of inline power classification cycles, each comprising:
         applying a classification voltage to the conductors,
         measuring current in the conductors while the classification voltage is applied to yield measured current, and
         determining a class corresponding to the measured current to yield a plurality of classes over the plurality of inline power classification cycles;
      combine the plurality of classes into a classification code for the PD; and
      determine that the classification code corresponds to a predetermined security message.

2. The system of claim 1, wherein the instructions when executed further cause the system to:
   sound an alarm responsive to receipt of the predetermined security message.

3. The system of claim 1, wherein the instructions when executed further cause the system to:
   forward an alarm message in response to receipt of the predetermined security message.

4. The system of claim 1, wherein the instructions when executed further cause the system to:
   during the plurality of inline power classification cycles, concurrently drop a voltage signal applied to the conductors below a reset logic level between classification cycles.

5. The system of claim 1, wherein the instructions when executed further cause the system to:
   during the plurality of inline power classification cycles, concurrently ramp a voltage signal applied to the conductors to a marker level voltage between classification cycles, the marker level voltage being outside a range of the classification voltage and above a reset logic level for the PD.

6. A method, comprising:
   in response to an interrupted flow of inline power between power sourcing equipment (PSE) and a powered device (PD), discovering that the PD is adapted to receive inline power from the PSE, wherein the PD is coupled to the PSE in a wired data communications network having conductors coupling the PD and the PSE;
   applying a classification voltage to the conductors;
   measuring current in the conductors to yield measured current; and
   determining that the measured current corresponds to a security message.

7. The method of claim 6, further comprising:
   in response to determining that the measured current corresponds to the security message, sounding an alarm.

8. The method of claim 6, further comprising:
   in response to determining that the measured current corresponds to the security message, forwarding an alarm message.

9. The method of claim 6, wherein the security message is manually initiated.

10. The method of claim 6, wherein the security message is initiated in response to a sensor output.

11. The method of claim 6, wherein the classification voltage is a voltage in a range of about 15 volts DC (direct current) to about 20 volts DC.

12. The method of claim 6, wherein determining that the measured current corresponds to the security message comprises using a lookup table indexed by current value to identify the security message associated with the measure current.

13. The method of claim 6, wherein the conductors comprise two pairs of conductors.

14. The method of claim 6, wherein the conductors comprise four pairs of conductors.

15. The method of claim 6, wherein the current is measured while the classification voltage is applied to the conductors.

16. The method of claim 6, further comprising:
   measuring a series of current levels in the conductors;
   determining a plurality of classes based on the series of current levels; and
   combining the plurality of classes into a classification code, wherein determining that the measured current corresponds to the security message is based on the classification code.

17. A non-transitory computer-readable storage medium storing instructions which, when executed by a processor, cause the processor to perform operations comprising:
   in response to an interrupted flow of inline power between power sourcing equipment (PSE) and a powered device (PD), discovering that the PD is adapted to receive inline power from the PSE, wherein the PD is coupled to the PSE in a wired data communications network having conductors coupling the PD and the PSE;
   applying a classification voltage to the conductors;
   measuring current in the conductors to yield measured current; and
   determining that the measured current corresponds to a security message.

18. The non-transitory computer-readable storage medium of claim 17, storing additional instructions which, when executed by the processor, cause the processor to perform the operations further comprising:
   in response to determining that the measured current corresponds to the security message, sounding an alarm.

19. The non-transitory computer-readable storage medium of claim 17, storing additional instructions which, when executed by the processor, cause the processor to perform the operations further comprising:

in response to determining that the measured current corresponds to the security message, forwarding an alarm message.

20. The non-transitory computer-readable storage medium of claim 17, wherein the security message is initiated at the PD in response to a sensor output.

* * * * *